July 29, 1958 — F. E. SCHULTZ — 2,844,939
TUBE-BUNDLE COMBUSTION CHAMBER
Filed Oct. 4, 1954

Inventor:
Frederick E. Schultz,
by His Attorney.

United States Patent Office 2,844,939
Patented July 29, 1958

2,844,939

TUBE-BUNDLE COMBUSTION CHAMBER

Frederick E. Schultz, Scotia, N. Y., assignor to General Electric Company, a corporation of New York Application October 4, 1954, Serial No. 459,921

3 Claims. (Cl. 60—39.69)

This invention relates to a tube-bundle combustion chamber and has for its object the prevention of leaks between the tubes which make up the wall of the combustion chamber.

In the construction and cooling of rocket motors, e. g., the high temperatures, often as high as 2700° C. and higher, accompanying combustion of the reactants have posed difficult problems. One solution to the problems posed by such high temperatures has been the use of a combustion chamber fabricated from tubes through which are circulated coolants, for example one of the reactants to be supplied to the combustion chamber. The greatest difficulty in fabrication and use of these tube motors is the frequency of occurrence of small leaks of combustion gases between the tubes. These leaks cause the binding wire, or other structural members which bind the tubes together and prevent chamber pressure from forcing them outward, to be heated and weakened or completely burned through resulting in complete motor failure.

In the manufacture of tube-bundle combustion chambers for rocket motors in the past considerable time and money have been consumed in testing and inspecting the finished product to detect leaks. After the leaks were found, patching procedures and subsequent testing and inspecting were required, and frequently the cycle had to be repeated several times. Development of leaks was due in part to the expansion and contraction of the combustion chamber tubes and often leaks developed during operation of the motor even though they were not present at the start.

Briefly stated in accordance with one aspect of this invention, a tube-bundle combustion chamber is provided with a flexible, substantially non-porous envelope surrounding it to prevent leakage of combustion gases between the tubes even during expansion and contraction of the tubes.

The invention will be better understood from a perusal of the following description taken in connection with drawings, and the scope of the invention will be pointed out in the appended claims.

Figure 1:
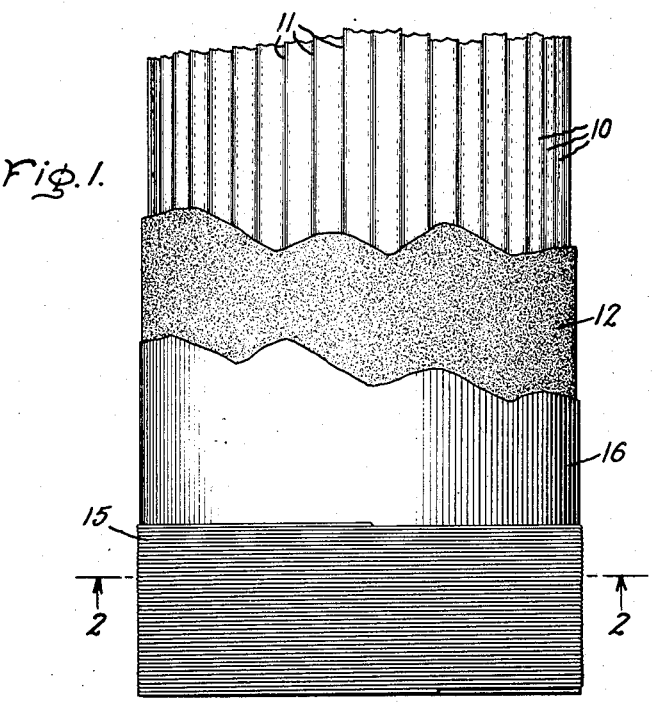
Fig. 1 is a fragmentary view of the combustion chamber wall of a rocket motor having the various layers of the construction broken away for clarity.
Figure 2:
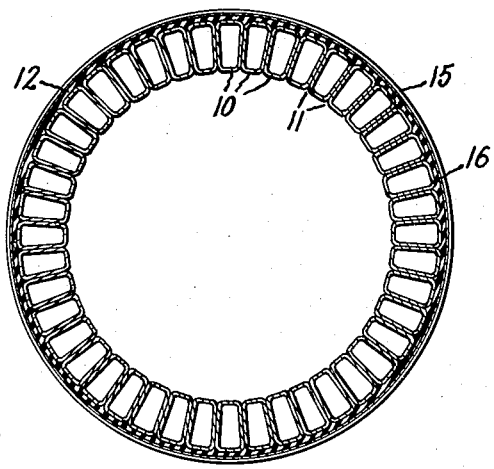
Fig. 2 is a sectional view taken along the line 2—2 of Fig. 1.
Figure 3:
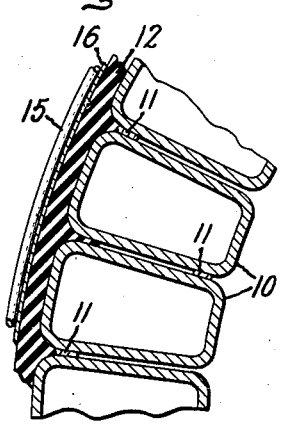
Fig. 3 is an enlarged fragmentary view of a portion of Fig. 2.

Referring more particularly to the drawings, a plurality of tubes 10 are secured together to form a hollow elongated combustion chamber which is adapted to receive combustible elements. The tubes 10 are of metal, copper, steel, aluminum and nickel having been successfully used, and they may be secured together by brazing, soldering or welding as indicated at 11. The preferred shape of the tubes is trapezoidal as shown since this shape is admirably suited to form the hollow combustion chamber with the minimum waste of space and the maximum volume for coolant flow through the tubes.

A flexible, substantially non-porous envelope is provided surrounding the tubes 10 for preventing escape of combustion gases through pin-hole leaks which develop between the tubes. Flexibility of the envelope is important to permit expansion and contraction of the tubes without developing leakage holes in the envelope. In its preferred form, this envelope is a thin coating of neoprene rubber 12 formed in a solid coating immediately adjacent the tube-bundle. One method of applying the coating which has been proven successful has been painting the outer surface of the tubes with liquid neoprene to which has been added a catalyst to promote air curing. It will be appreciated that other methods, such as spraying, dipping, plastering or electroplating may be used to apply the flexible coating to the tubes 10.

A binding means is provided for keeping the envelope 12 in intimate contact with the tubes 10 and for maintaining the combustion chamber in a predetermined shape against the forces set up by the pressure of the combustion gases. This binding means in the illustrated embodiment of the invention comprises binding wire 15 which is preferably wound around the outside of the tubes 10 and secured in place as by welding or soldering. A thin metal shim 16 may be used to surround the rubber coating, and serves to prevent the binding wire from cutting or damaging the rubber and also to prevent the rubber from heating and flowing during the welding or soldering operation.

It has been proven by actual tests that the flexible envelope in the form of a rubber coating effectively prevents leakage of the hot gases from the combustion chamber even though the temperatures in the combustion chamber may be 2700° C. or higher. The rubber coating does not melt or burn through as would ordinarily be expected. The worst effect noted has been a slight charring of the surface of the rubber immediately adjacent a leak between the tubes 10, and this charring does not break down the non-porous characteristics of the coating. It is believed that a contributing factor to the success of the rubber coating in preventing leakage is that the cavities or pockets existing between the tubes, which are not filled with welding or other material, are filled with gases which are are much cooler than the hottest combustion gases. Thus, these pockets provide a cool gas barrier between the rubber coating and the hottest combustion gases.

While the invention has been illustrated and described with respect to a particular embodiment thereof, it will be understood that it is intended to cover all changes and modifications of the embodiment shown which do not constitute departures from the spirit and scope of the invention.

What is claimed as new and desired to be secured by United States Letters Patent is:

1. A tube-bundle combustion chamber for a rocket motor comprising a plurality of tubes secured together to form a hollow elongated chamber adapted to receive combustible reactants, a non-metallic flexible substantially non-porous cylindrical envelope surrounding said tubes, and binding means surrounding the envelope for keeping it in intimate contact with said tubes and for maintaining said chamber in a predetermined shape against the forces set up by the pressure of the combustion gases tending to separate the tubes, said envelope thus being effective to prevent escape of combustion gases between the tubes.

2. A tube-bundle combustion chamber for high temperature combustion comprising a plurality of tubes secured together to form a hollow elongated combustion chamber, a rubber coating surrounding the chamber and forming a fluid impervious layer for preventing leakage of combustion gases between said tubes, and binding means surrounding said coating for keeping it in intimate contact with the tubes and for maintaining said chamber in a predetermined shape against the forces set up by the pressure of the combustion gases tending to separate the tubes.

3. A combustion chamber as set forth in claim 2, said binding means including binding wire and a protective layer of metal disposed between the rubber coating and the binding wire to protect said rubber coating from damage by the wire.

References Cited in the file of this patent

UNITED STATES PATENTS

| | | |
|---|---|---|
| 1,935,659 | Noack | Nov. 21, 1933 |
| 2,122,521 | Goddard | July 5, 1938 |
| 2,395,403 | Goddard | Feb. 26, 1946 |

OTHER REFERENCES

Astronautics, No. 35, October 1936, page 8.